F. W. FLYNN.
COTTON-GIN FEEDER.
No. 7,261. Reissued Aug. 15, 1876.
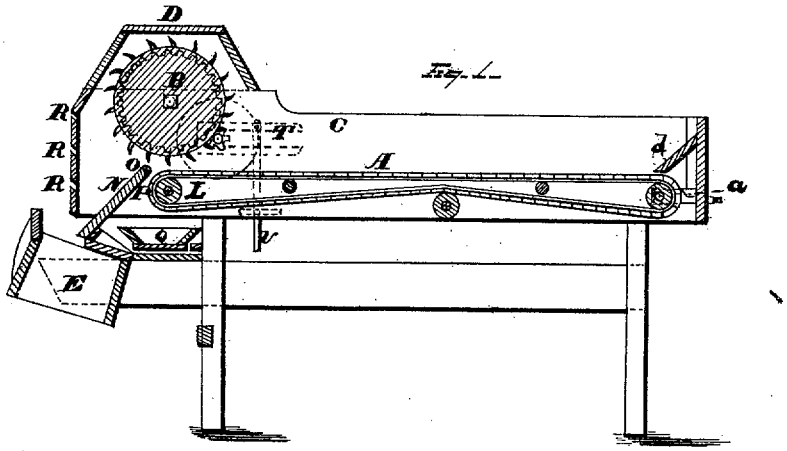
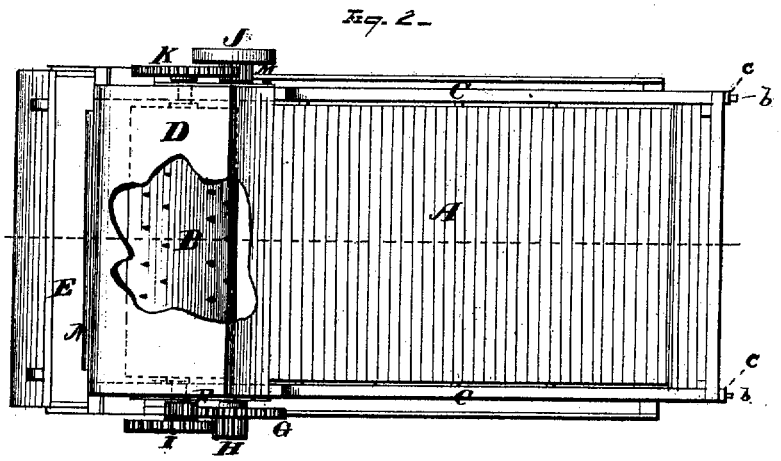
WITNESSES
Ed. S. Stillingham,
Albert H. Bright.
INVENTOR
Frederick W. Flynn.
By H. A. Seymour,
Attorney.
N. PETERS, PHOTO-LITHOGRAPHER, WASHINGTON, D. C.

UNITED STATES PATENT OFFICE.

FREDERICK WILLIAM FLYNN, OF GERMANTOWN, TENNESSEE, ASSIGNOR, BY MESNE ASSIGNMENTS, TO WILLIAM H. LOCKWOOD.

IMPROVEMENT IN COTTON-GIN FEEDERS.

Specification forming part of Letters Patent No. 162,371, dated April 20, 1875; reissue No. 7,261, dated August 15, 1876; application filed June 19, 1876.

*To all whom it may concern:*

Be it known that I, FREDERICK W. FLYNN, of Germantown, in the county of Shelby and State of Tennessee, have invented a new and Improved Cotton-Gin Feeder, of which the following is a specification:

Figure 1 is a longitudinal sectional elevation of my improved cotton-gin feeder; and Fig. 2 is a plan view, with a part of the hood broken out to show the revolving toothed drum.

My invention consists, first, in the combination, with the toothed drum or feeding-drum and endless carrier of a cotton-gin feeder, of a driving-pulley and gear-wheel secured to a laterally-adjustable shaft, and gearing secured to a counter-shaft attached to the opposite side of the machine to connect the toothed drum with the driving-roller of the endless carrier; second, the combination, with the driving gear-wheel, of the toothed drum of the driving-pulley, secured to a shaft journaled in a sliding bearing, whereby the feeder may be readily thrown in and out of gear without displacing the driving-belt; third, the combination, with the toothed or feeding drum and endless carrier, of a pivoted apron, arranged in advance of the endless carrier, so as to form a space between the carrier and apron through which the trash may fall; fourth, the combination, with the toothed or feeding drum, endless carrier, and apron, pivoted in advance of the endless apron, of a trough located beneath the endless carrier, to receive the trash as it falls between the pivoted apron and endless carrier.

In the accompanying drawings, wherein like letters denote like parts, A is an endless carrier, suitably supported on rollers, the rear roller A′ being journaled in a sliding bearing, *a*, which may be adjusted, as desired, by means of the nut *c* on the threaded bolt *b*, which latter is secured to the sliding bearing *a*. As the tension of the endless apron becomes impaired, it may be restored by turning down the nut *c* on the bolt *b*.

In order to prevent the cotton from falling through the space at the end of the box, the shield or inclined apron *d* is secured to the box, so that its lower edge shall be in close proximity to the surface of the endless carrier.

B is the revolving toothed drum, located within the hood D, and the same operates to feed the seed-cotton to the breast E of the cotton-gin. To the outer end of the shaft or axle of the drum B is removably secured the gear-wheel K, which meshes with a pinion, M, attached to the side of the driving-pulley J. The combined pulley and pinion rotates on a shaft secured to a slide, T, which is laterally moved by means of a shifting-lever, U, to throw the driving-pulley in or out of gear with the operative parts of the machine. Thus, the driving-pulley may be continually rotated while the gin is in operation, and when it is desired to stop the cotton-gin feeder the same is effected by simply throwing the driving-pinion out of gear with the gear-wheel of the toothed drum.

The endless carrier is geared to the toothed drum as follows, whereby the desired relative movement of drum and apron is effected: To the opposite end of the drum-shaft is secured a pinion, F, which meshes with a gear-wheel, G, attached to a counter-shaft, which also carries a pinion, H, that engages with a gear-wheel, I, secured to the shaft of the apron-roller L.

As the cotton-gins now in use are ordinarily located, when in operation, so that access can only be had to one side of the gin, it is, therefore, necessary to construct a feeder so that it can be readily adapted to be operated by a belt running on either side of the gin, and this desideratum is secured by my improved feeder, as the gearing is made so that it can be applied to either side of the same, and hence the driving-pulley may be secured to either side of the feeder, as desired.

In front of the roller L of the endless carrier A is pivoted the apron N, forming a space, P, through which the trash, sand, and dust may fall or be blown into the trough Q, placed below said opening. The apron N, being pivoted, yields to suit varying heights of cotton-gins, whereby it may be raised or lowered without affecting the operation of the machine.

The hood D is perforated at R to allow of the escape of the dust as it is forced outwardly by the blast created by the drum B in rapid rotation.

Having fully described my invention, what I claim as new, and desire to secure by Letters Patent, is—

1. In a cotton-gin feeder, the combination, with the toothed drum B, endless carrier A, and roller L, of driving pulley and gear J M, secured to a laterally-moving shaft, and the gearing F G H I, arranged substantially as and for the purpose described.

2. The combination, with the toothed or feeding drum and endless carrier, of the driving gear and pulley, secured to a sliding bearing, substantially as and for the purpose set forth.

3. The combination, with an endless carrier and toothed or feeding drum, of an apron pivoted in advance of the endless carrier to form an intervening space, substantially as and for the purpose set forth.

4. The arrangement with relation to the endless carrier, toothed feeding-drum, and pivoted apron, as set forth, of a trough below said endless carrier, substantially as and for the purpose described.

In testimony that I claim the foregoing I have hereunto set my hand.

FREDERICK WILLIAM FLYNN.

Witnesses:
J. C. BUSTER,
J. H. WRAY.